US006622843B2

(12) United States Patent
Nakagawa et al.

(10) Patent No.: US 6,622,843 B2
(45) Date of Patent: Sep. 23, 2003

(54) ELECTROMAGNETIC CLUTCH (75) Inventors: Junichi Nakagawa, Nagoya (JP);
Akira Kishibuchi, Nagoya (JP);
Satoshi Kawakami, Kariya (JP); Naoji Konaga, Okazaki (JP); Katsuya Tsuchizu, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/021,160

(22) Filed: Dec. 19, 2001

(65) Prior Publication Data

US 2002/0074204 A1 Jun. 20, 2002

(30) Foreign Application Priority Data

| Dec. 20, 2000 | (JP) | 2000-387624 |
| Dec. 25, 2000 | (JP) | 2000-392789 |
| Dec. 26, 2000 | (JP) | 2000-395529 |
| Dec. 26, 2000 | (JP) | 2000-395530 |
| Aug. 22, 2001 | (JP) | 2001-251898 |
| Aug. 23, 2001 | (JP) | 2001-253237 |

(51) Int. Cl.$^7$ .................. F16D 27/112; F16D 27/14
(52) U.S. Cl. .................. 192/84.941; 192/30 V; 192/84.961
(58) Field of Search .................. 192/84.94, 84.941, 192/84.961, 30 V, 110 B (56) References Cited

U.S. PATENT DOCUMENTS

| 3,036,679 A | * | 5/1962 | Millington et al. ...... 192/84.94 |
| 3,055,475 A | * | 9/1962 | Pitts ........................ 192/84.94 |
| 3,570,640 A | * | 3/1971 | Martz ....................... 192/110 B |
| 3,586,145 A | * | 6/1971 | Cunningham et al. .... 192/30 V |
| 3,994,379 A | * | 11/1976 | Miller et al. ............. 192/111 A |
| 4,285,421 A | * | 8/1981 | Halsted ................... 192/110 B |
| 4,557,360 A | * | 12/1985 | Kumatani ................. 192/30 V |
| 5,036,964 A | * | 8/1991 | Booth et al. .............. 192/30 V |
| 5,199,541 A | * | 4/1993 | Tobyama et al. ........ 192/84.941 |
| 5,372,228 A | * | 12/1994 | VanLaningham et al. ..................... 192/84.941 |
| 5,909,075 A | * | 6/1999 | Heimark .................... 310/103 |
| 6,194,803 B1 | * | 2/2001 | Heim et al. ............. 192/84.941 |
| 6,209,699 B1 | * | 4/2001 | Hayashi et al. ......... 192/84.941 |

FOREIGN PATENT DOCUMENTS

JP   U-6-30535   4/1994

* cited by examiner

*Primary Examiner*—Rodney H. Bonck
(74) *Attorney, Agent, or Firm*—Posz & Bethards, PLC

(57) ABSTRACT

In an electromagnetic clutch, a rotor, an armature and a stator housing including an electromagnetic coil are assembled to a center hub through a bearing member. Therefore, by assembling the center hub to an engine crank shaft, an assembling operation of the electromagnetic clutch to a vehicle is finished. In addition, a stator plate fixed to the stator housing is fixed to an engine through a bushing made of an elastic material. Therefore, a vibration displacement of the stator housing relative to the rotor, generated due to vibration of the engine, can be absorbed.

22 Claims, 5 Drawing Sheets

ELECTROMAGNETIC CLUTCH

CROSS-REFERENCE TO RELATED APPLICATION

This application is related to Japanese Patent Applications No. 2000-387624 filed on Dec. 20, 2000, No. 2000-392789 filed on Dec. 25, 2000, No. 2000-395529 filed on Dec. 26, 2000, No. 2000-395530 filed on Dec. 26, 2000, No. 2001-251898 filed on Aug. 22, 2001, and No. 2001-253237 filed on Aug. 23, 2001, the contents of which are hereby incorporated by reference.

BACKGROUND OF THE INVENTION

1. Field of the Invention

The present invention relates to an electromagnetic clutch for transmitting and interrupting a driving force from a driving source to a driven device. The present invention is suitably used for an electromagnetic clutch for transmitting and interrupting a driving force of a vehicle engine to a rotation unit in an engine component, such as an oil pump and a compressor.

2. Description of Related Art

A conventional electromagnetic clutch described in JP-U-6-30535 includes a rotor rotated and driven by a driving source such as an engine, an armature disposed to have a predetermined clearance with the rotor, and an electromagnetic coil for generating an electromagnetic force between the armature and the rotor. In addition, the armature is fixed to a center hub connected to a shaft of the compressor, the rotor is assembled to a front housing of the compressor through a bearing, and the electromagnetic coil is assembled to a plate fixed to the front housing. Accordingly, in this clutch structure, plural assembling steps at least more than three are necessary, and it is difficult to reduce assembling process.

On the other hand, in conventional clutch structures, there may be caused regarding problems such as an increased clearance between a stator housing and a rotor, an oil adhesion on an electromagnetic clutch during an engine inspection or during an oil addition, a noise generation and the like.

SUMMARY OF THE INVENTION

In view of the foregoing problems, it is an object of the present invention to reduce assembling steps of an electromagnetic clutch.

It is an another object of the present invention to provide an electromagnetic clutch which prevents a clearance between a rotation member such as a rotor, and a holding member for holding an electromagnetic coil from becoming larger.

It is a further another object of the present invention to prevent an oil from being adhered onto an armature of the electromagnetic clutch.

It is a further another object of the present invention to provide an electromagnetic clutch which can prevent a noise generated when an armature, a plate spring and the like collide with each other.

It is a further another object of the present invention to provide an electromagnetic clutch which reduces a noise without using a cover covering the whole electromagnetic clutch.

According to the present invention, in an electromagnetic clutch for transmitting and interrupting a driving force of a driving source to a driven device, a driving-side rotation member is disposed to be rotated by the driving source, a driven-side rotation member is disposed rotatably to be connected to a side of the driven device, an electromagnetic coil is disposed for generating an electromagnetic force when being supplied with power, and an armature is connected to one of the driving-side rotation member and the driven-side rotation member. The armature has a friction surface which contacts the other one of the driving-side rotation member and the driven-side rotation member by the electromagnetic force generated from the electromagnetic coil, to transmit the driving force from the driving-side rotation member to the driven-side rotation member. In the electromagnetic clutch, the driven-side rotation member and the electromagnetic coil are assembled to the driving-side rotation member through a bearing member. Accordingly, by assembling the driving-side rotation member to a shaft of the driving source, the assembling operation of the electromagnetic clutch to the driving source is finished, and assembling steps of the electromagnetic clutch to the driving source can be finished. As a result, assembling steps of the electromagnetic clutch to the driving source can be reduced.

Preferably, a holding member for holding the electromagnetic coil is fixed through a bushing made of an elastic material. Therefore, it can absorb a relative vibration displacement of the holding member relative to the rotation member, generated due to a vibration of a member to which the holding member is fixed, and can absorb a dimension differences of the holding member and the rotation member. Accordingly, a suitable clearance between the holding member and the rotation member can be maintained.

Further, the driving-side rotation member, the driven-side rotation member and the armature are disposed so that a rotation axis of the armature is substantially parallel, a wall surface is provided in a ring shape to enclose the armature at an outer radial side of the armature, and the wall surface is substantially parallel to each rotation axis of both the driving-side rotation member and the driven-side rotation member. Therefore, even when an oil drops onto the electromagnetic clutch in an engine checking operation or in an engine oil addition, dropped oil flows downwardly along the wall surface without flowing toward the armature. Alternatively, a circular recess portion is recessed in an approximate U-shape in cross section in a rotation axial direction of both the driving-side rotation member and the driven-side rotation member, to enclose the armature at an outer radial side of the armature. Therefore, even when the oil drops onto the electromagnetic clutch, the dropped oil flows downwardly along the recess portion from the electromagnetic clutch, and an oil adhesion on the armature of the electromagnetic clutch can be prevented. Alternatively, an inner peripheral wall surface of the armature is provided with a taper portion tapered in such a manner that a diameter of the inner peripheral wall surface is enlarged as toward a side opposite to the friction surface. Therefore, oil moving to the inner peripheral wall surface flows to the side opposite to the friction surface, and falls from the electromagnetic clutch.

Preferably, a spring member is disposed to be partially connected to the armature, for generating an elastic force for separating the armature from the other one of the driving-side rotation member and the driven-side rotation member. Further, a damper member for absorbing a collision shock is disposed on at least one side of an opposite portion of the spring member, opposite to the armature, and an opposite portion of the armature, opposite to the spring member. Accordingly, it can prevent a direct collision between the armature and the spring member at a time where the electromagnetic clutch is turned off, and it can restrict a collision noise from being caused.

Preferably, a vibration-restriction member for absorbing vibration of the armature is disposed to be fixed to the armature. Because the vibration of the armature can be absorbed, a noise due to the vibration of the armature can be reduced without using a cover covering the whole electromagnetic clutch. More preferably, the vibration-restriction member is fixed to the armature through a bonding member made of a visco-elastic material. Therefore, the noise due to the vibration of the armature can be further reduced without using a cover covering the whole electromagnetic clutch.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

Preferred embodiments of the present invention will be described hereinafter with reference to the accompanying drawings.

A first preferred embodiment of the present invention is described with reference to FIGS. 1–5. In the first embodiment, the present invention is typically applied to a driving system of a compressor for a hybrid vehicle where the vehicle is travelled by a combination between an engine and a travelling electrical motor.

Figure 1:
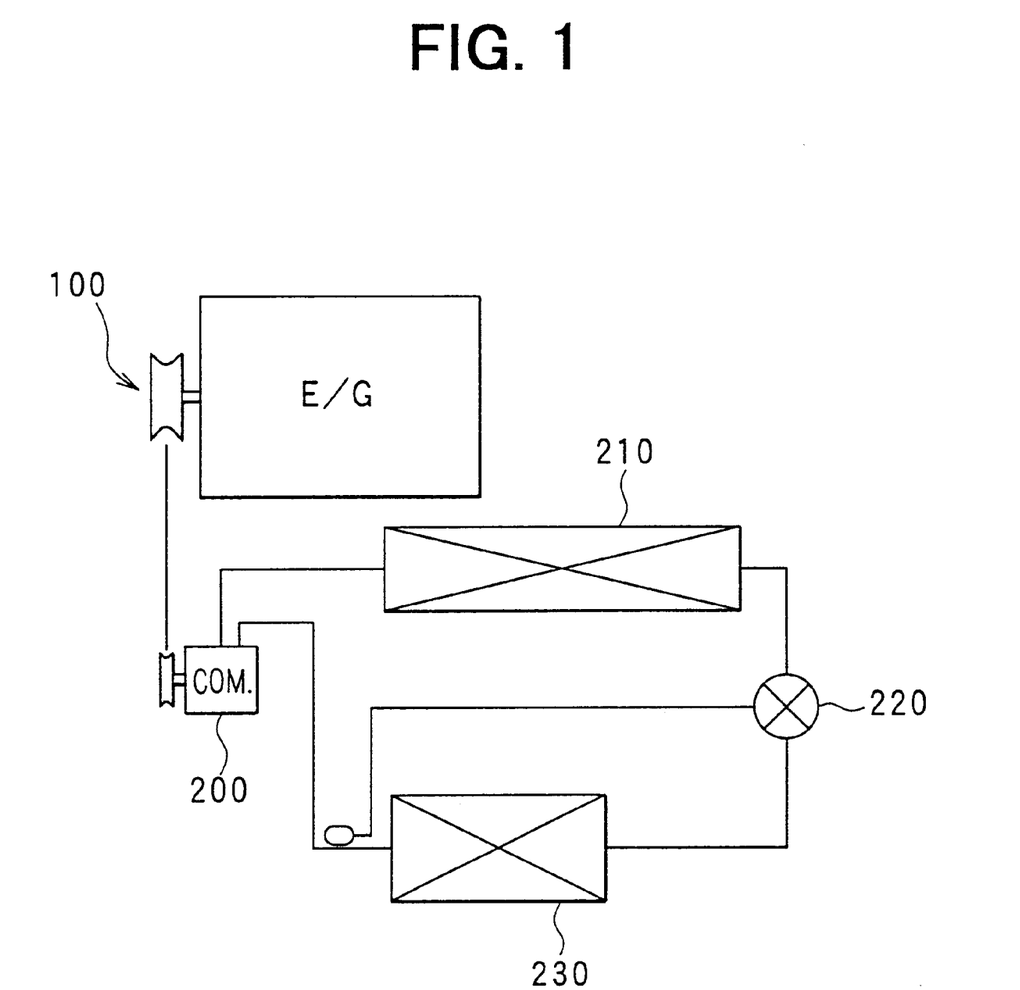
FIG. 1 is a schematic diagram showing a power transmitting system using an electromagnetic clutch according to a first preferred embodiment of the present invention.

As shown in FIG. 1, in this driving system, a driving force of the engine (E/G, internal combustion engine) is interruptibly transmitted to a compressor 200 (driven device, a rotation member) through an electromagnetic clutch 100 in which a clutch and a pulley for a V-belt are integrated. The electromagnetic clutch 100 is directly connected to a crank shaft of the engine.

In a case where a vehicle air conditioner operates (i.e., an air-conditioning switch is turned on), the electromagnetic clutch 100 is turned on when the engine operates, so that the driving force of the engine is transmitted to the compressor 200. In this case, while the operation of the engine is stopped, the electromagnetic clutch 100 is turned off, so that the compressor 200 is driven by an electrical motor different from the travelling electrical motor.

A radiator (condenser) 210 is disposed to cool refrigerant discharged from the compressor 200 by performing a heat exchange between refrigerant and outside air, a press-reducing unit 220 is disposed to decompress refrigerant flowing from the radiator 210, and an evaporator 230 is disposed to cool air blown into the passenger compartment by performing a heat exchange between refrigerant decompressed in the press-reducing unit 220 and air. In the first embodiment, as the press-reducing unit 220, a thermal expansion valve for mechanically adjusting a valve opening degree is used so that a heating degree of refrigerant at an outlet side of the evaporator 230 becomes a predetermined value.

Figure 2:
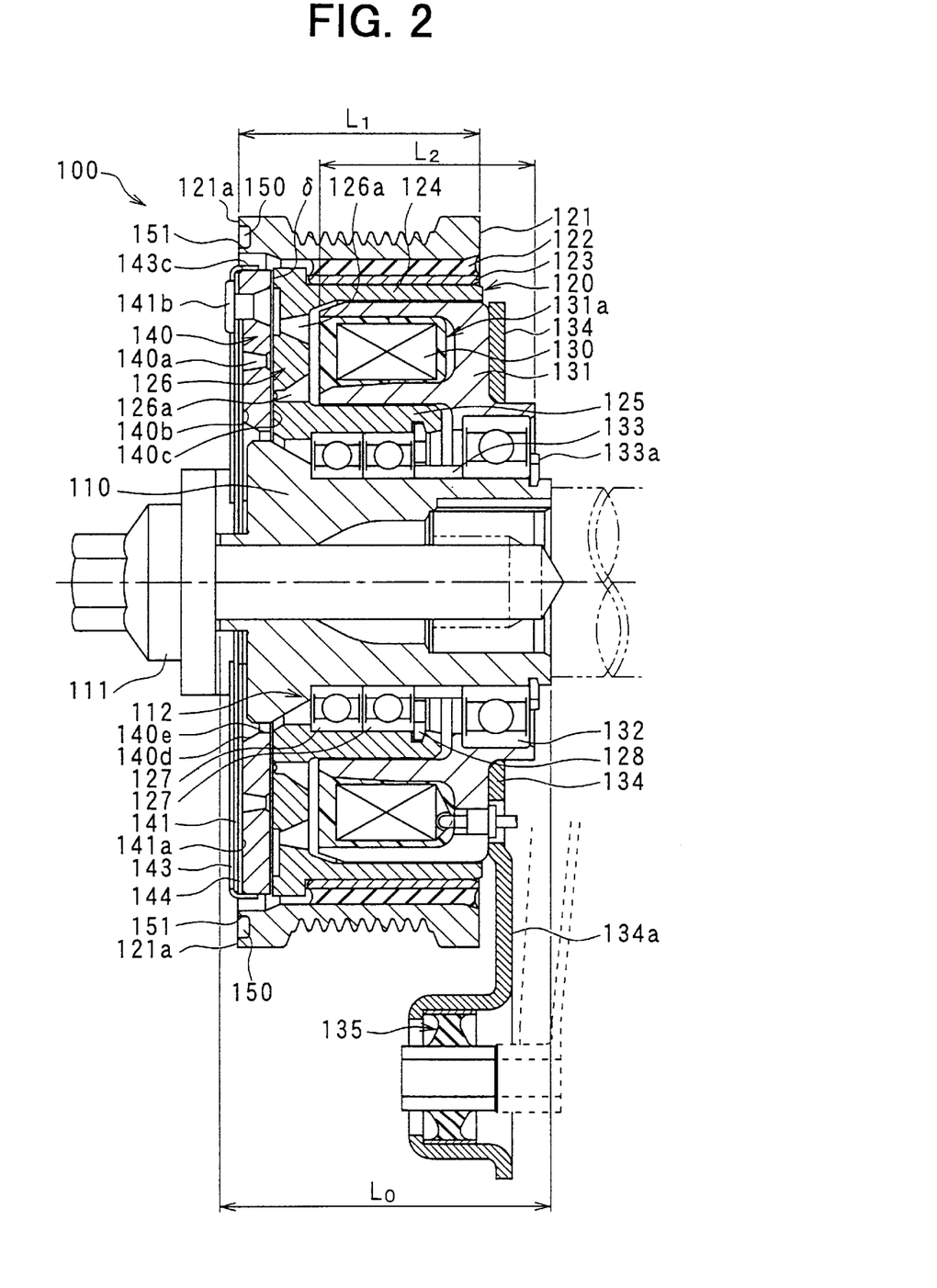
FIG. 2 is a sectional view showing the electromagnetic clutch according to the first embodiment.

Next, the structure of the electromagnetic clutch 100 according to the first embodiment will be now described. As shown in FIG. 2, a center hub 110 (driving-side rotation member) made of a metal is connected to the crank shaft of the engine to be integrally rotated with the crank shaft. The center hub 110 is fixed to the crank shaft by using a bolt 111, in a rotation-stop state relative to the crank shaft due to a key (see JIS B 1301).

A rotor 120 (driven-side rotation member) is disposed to rotate integrally with an approximate cylindrical pulley 121 on which a V-belt is hung. The rotor 120 and the pulley 121 are connected through a first damper 122 made of an elastically-deformable elastic material. In the first embodiment, the elastic material is ethylene-propylene-diene polymer rubber (EPDM), for example.

The first damper member 122 is bonded to an inner cylinder wall of the pulley 121 made of a metal (e.g., FC material) and an outer wall of the cylindrical member 123 by a vulcanizing bonding. The cylindrical member 123 made of a metal (e.g., SGP material) is press-fitted to an outer cylinder wall of the rotor 120. Accordingly, torque (driving force) is transmitted between the rotor 120 and the pulley 121 by a shearing force applied to the first damper member 122.

The rotor 120 has a double cylinder structure composed of an outer cylinder portion 124, an inner cylinder portion 125 and a ring plate portion 126 (friction plate) connecting the outer cylinder portion 124 and the inner cylinder portion 125 at one end side in an axial direction. The outer cylinder portion 124, the inner cylinder portion 125 and the ring plate portion 126 are integrally formed by a ferromagnetism material (e.g., S10C) such as an iron material having a small carbon-containing amount. Accordingly, the rotor 120 constructs a part of a magnetic circuit of magnetic flux induced by an electromagnetic coil 130.

The rotor 120 is rotatably held in the center hub 110 by bearings 127 provided between the inner cylinder portion 125 and the hub 110. The inner race of the bearing 127 is press-fitted to an outer peripheral wall of the hub 110, and the outer race of the bearing 127 is press-fitted to an inner cylinder wall of the rotor 120, and the bearing 127 is inserted by a stop ring 128 and a step portion 112 formed in the hub 110 so that an axial portion of the bearing 127 is determined.

The electromagnetic coil (stator coil) 130 is formed into a ring shape, and is inserted between the outer cylinder portion 124 and the inner cylinder portion 125. The electromagnetic coil 130 is made of a ferromagnetism material such as an iron material (e.g., S10C) having a small carbon-containing amount, and is held in a stator housing 131 (holding member) used as a part of the magnetic circuit. The electromagnetic coil 130 is inserted in a double ring portion 131a of the stator housing 131, and is mold-fixed therein by filling resin (e.g., epoxide resin).

Here, the stator housing 131 is rotatably held in the hub 110 by a bearing 132 press-fixed to the outer peripheral wall of the hub 110. At this time, because the positions of the rotor 120 and the stator housing 131 are set using the hub 110 as a standard, the position of the stator housing 131 (the electromagnetic coil 130) can be accurately set relative to the rotor 120. The bearing 132 is disposed to be inserted in the axial direction between a stop ring 133a and a cylindrical collar 133 so that the position of the bearing 132 in the axial direction is set. Here, the collar 133 is disposed to contact an axial end of the bearing 127.

A stator plate 134 is fixed to the stator housing 131 to prevent the stator housing 131 (electromagnetic coil 130) from rotating together with the hub 110 and to support the stator housing 131 together with the bearing 127. An arm portion 134a protruding to a radial outside from the pulley 121 is disposed, and the stator plate 134 is fixed to a crank casing of the engine through a bushing 135 (vibration-preventing rubber). The bushing 135 is made of an elastic material such as ethylene-propylene-diene polymer rubber (EPDM), and is attached to the arm portion 134a.

An armature 140 is made of a ferromagnetism material (e.g., S10C) such as an iron material having a small carbon-containing amount, and is formed into a ring shape to be moved to the ring plate portion 126 due to electromagnetic force generated by the electromagnetic coil 130. The armature 140 contacts the ring plate (friction plate) 126 by an electromagnetic-absorbing force, generated between the armature 140 and the ring plate 126, due to a magnetic field induced by the electromagnetic coil 130.

Magnaflux-shutting portions 140a, 126a are provided in he armature 140 and the ring plate portion 126 so that a magnetic flux is meanderingly formed between the armature 140 and the ring plate portion 126. The magnaflux-shutting portions 140a, 126a can be formed by providing a clearance in the magnetic circuit or by embedding a non-magnetic material partially.

Figure 3:
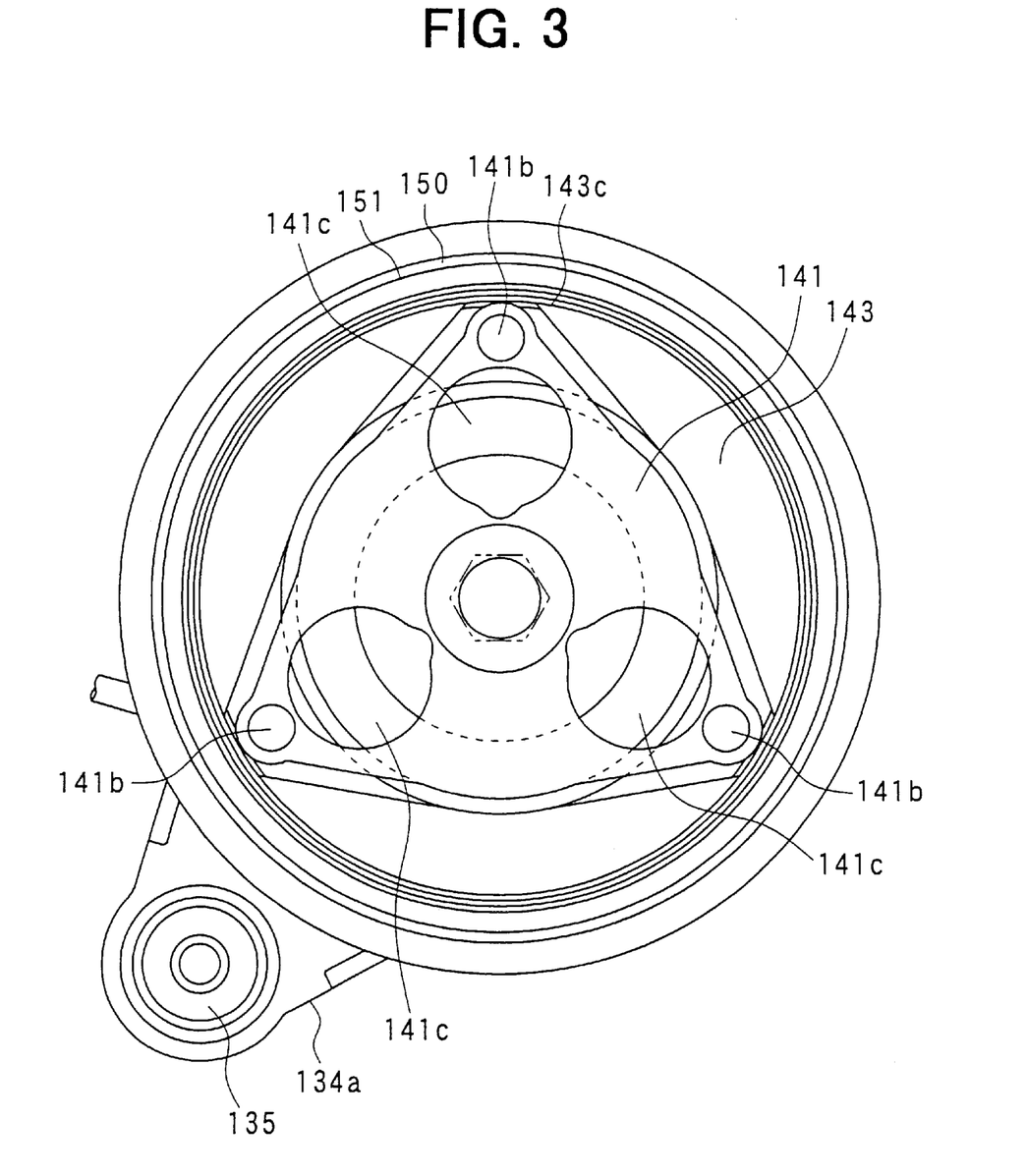
FIG. 3 is a side view of the electromagnetic clutch when being viewed from a left side in FIG. 2.

A plate spring 141 is disposed to generate an elastic force for moving the armature 141 to be away from the ring plate portion 126. As shown in FIG. 3, the plate spring 141 is formed into an approximate triangular shape, and is partially connected to the armature 140 by using rivets 141b provided at its top angle parts. In addition, a center portion of the plate spring 141 is connected and fixed to the center hub 110 in a rotation-stopping state. In the first embodiment, it can prevent the plate spring 141 from being removed from the hub 110 by using the bolt 111. As shown in FIG. 3, holes 141c are provided in the plate spring so that the elastic coefficient of the plate spring 141 is reduced.

Figure 4:
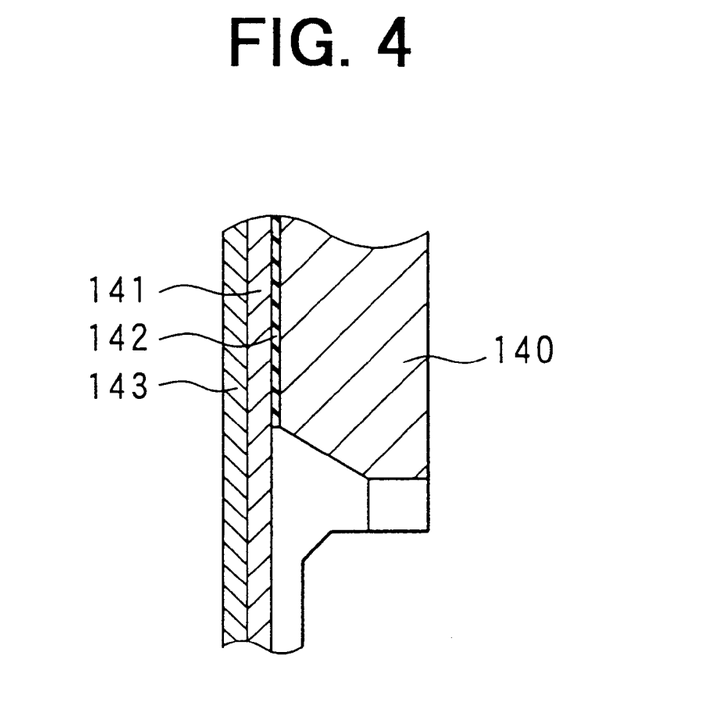
FIG. 4 is a partial-enlarged sectional view showing a damper member for absorbing a shock in the electromagnetic clutch according to the first embodiment.
Figure 5:
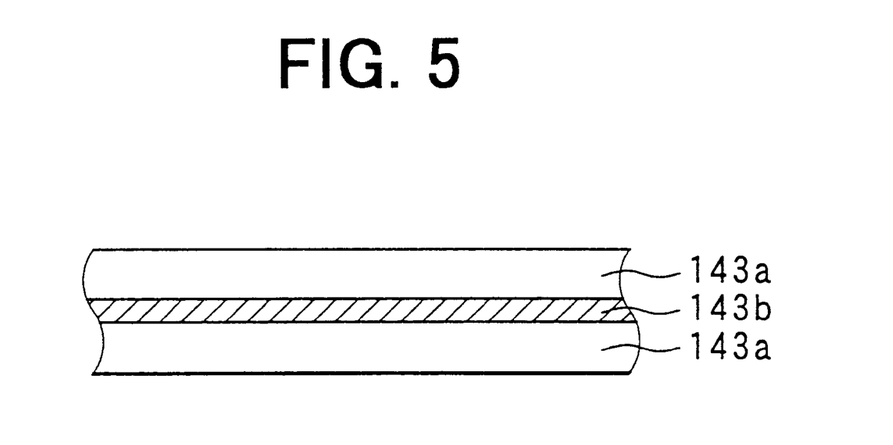
FIG. 5 is a sectional view showing a vibration-restricting steel plate used for the electromagnetic clutch according to the first embodiment.

As shown in FIG. 4, a second damper member 142 for absorbing a shock is bonded (coated) by the vulcanizing bonding at least on one side surface of an opposite surface 141a of the plate spring 141, opposite to the armature 140, and opposite surface 140b of the armature 140, opposite to the plate spring 141. The second damper member 142 is made of an elastic material such as ethylene-propylene-diene polymer rubber (EPDM). A vibration-restriction steel plate 143 for absorbing a vibration of the armature 140 is bonded by a bonding sheet 144 at least at a position of the armature 140 without being opposite to the plate spring 141. As shown in FIG. 5, the vibration-restriction steel plate 143 has a three-layer structure (a sandwich structure) in which a visco-elastic layer 143b made of visco-elastic polymers such as a visco-elastic resin or a visco-elastic rubber is placed between two steel plates 143a. Here, the visco-elastic polymers for forming the visco-elastic layer 143b is a material having sufficient viscosity and elasticity.

Accordingly, the vibration-restricting steel plate 143 absorbs the vibration of the armature 140 by using a vibrating system composed of the mass of the steel plates 143a, and the spring characteristic and the viscous damping coefficient of the visco-elastic layer 143b.

The bonding sheet 144 is also made of a visco-elastic material having a large viscosity (viscous damping coefficient). Specifically, the bonding sheet 144 is a double-side coated non-woven tape having a nonwoven fabric as a core material. The nonwoven fabric can be elastically deformable in a thickness direction of the bonding sheets 144, and an adhesive (e.g., epoxide resin) is permeated into or is applied onto both surfaces of the nonwoven fabric.

The vibration-restriction steel sheet 143 is an integrated sheet integrated in the ring portion 143c jointed to an outer peripheral wall of the armature 140.

An axial end portion 121a of the pulley 121 at the side of the armature 140 protrudes to the plate spring 141 from a friction surface 140c, so that an outer peripheral side of the armature 140 is covered by the pulley 121. A circular recess 150 recessed in the axial direction is formed in the axial end portion 121a to have an approximate U shape in cross-section, and a wall surface 151 substantially parallel to the axial direction is formed into a ring shape to enclose the armature 140. The friction surface 140c is a surface of the armature 140, facing the ring plate portion 126 (friction surface).

A taper portion 140d is provided in an inner side wall surface 140e in such a manner that a diameter of the inner side wall surface is increased as toward a side (left side in FIG. 2) opposite to the friction surface 140c of the armature 140.

Next, assembling steps of the electromagnetic clutch 100 will be now described. First, the pulley 121, to which the first damper 122 and the cylindrical member are assembled, is assembled by press-fitting to the rotor 120 to which the bearings 127 are assembled, and the bearing 132 is assembled to the stator housing 131 including therein the electromagnetic coil 130 by press-fitting (first step).

Next, the rotor 120 assembled in the first step and the stator housing 131 assembled in the first step are assembled to the hub 110 by press-fitting from a side opposite to the side of the armature 140, in this order of the rotor 120 and the stator housing 131 (second step).

Then, the armature 140 is assembled to one side end of the hub 110 in the axial direction, opposite to the stator housing 131. In this case, a thin plate is inserted between the armature 140 and the rotor 120 so that an air gap between the armature 140 and the ring plate portion 126 is adjusted to a predetermined dimension. Thereafter, the armature 140 is fixed to the hub 110 by using the bolt 111.

Next, the operation of the electromagnetic clutch 100 will be now described. When the supply of electrical power to the electromagnetic coil 130 is stopped, the plate spring 141 is in a natural state (i.e., flat state without bending), and a small clearance δ (e.g., about 0.5 mm) is provided between the armature 140 and the ring plate portion (friction plate) 126, so that a transmission of the driving force from the hub 110 to the rotor 120 is shut.

On the other hand, when the electrical power is supplied to the electromagnetic coil 130, an electromagnetic absorbing force is generated between the armature 140 and the ring plate portion 126 by the magnetic field induced by the electromagnetic coil 130. Therefore, in this case, the plate spring 141 is bent, and the armature 140 moves to contact the ring plate portion 126 of the rotor 120. Accordingly, driving force is transmitted from the hub 110 to the rotor 120.

While the armature 140 contacts the ring plate portion 126 of the rotor 120, a clearance is generated between the armature 140 and the plate spring 141. On the other hand, while the armature 140 is separated from the rotor 120, the armature 140 contacts the plate spring 141 and each rivet 141b.

According to the first embodiment of the present invention, the rotor 120, the stator housing 131 (including the electromagnetic coil 130) and the armature 140, which are main components of the electromagnetic clutch 100, are assembled to the hub 110 through the bearings 127, 132. Therefore, by assembling the hub 110 to the crank shaft, the assemble operation of the electromagnetic clutch 100 to the vehicle is finished. Thus, assembling steps of the electromagnetic clutch 100 to the vehicle can be reduced, and production cost of the vehicle can be reduced.

As shown in FIG. 2, because each of an axial dimension L1 of the rotor 120 and an axial dimension L2 of the stator housing 131 including the electromagnetic coil 130 is made smaller than an axial dimension Lo of the hub 110 except for the head portion of the bolt 111, the axial dimension of the electromagnetic clutch 100 can be set at about the axial dimension Lo of the hub 110.

Further, because the vibration-restriction steel plate 143 is fixed to the armature 140, the vibration of the armature 140 can be absorbed. Therefore, noise due to the vibration of the armature 140 can be reduced without using a cover for covering the whole electromagnetic clutch 100. In addition, because the vibration-restriction steel plate 143 is bonded to the armature 140 through the bonding sheet 144, the vibration of the armature 140 can be also absorbed in the bonding sheet 144 in addition to the vibration-restriction steel plate 143. Accordingly, the noise due to the vibration of the armature 140 can be sufficiently reduced without using a cover for covering the whole electromagnetic clutch 100.

Because the opposite surface 141a of the plate spring 141, opposite to the armature 140, is covered by the second damper member 142, a direct collision between the armature 140 and the plate spring 141 can prevented when the electromagnetic clutch 100 is turned off. Therefore, a collision noise can be restricted at a time where the electromagnetic clutch 100 is turned off. In the first embodiment, because the second damper member 142 is provided for restricting the collision noise, when the thickness of the second damper member 142 is set approximately to be equal to or larger than 50 μm, the collision noise can be sufficiently restricted.

The circular recess 150 is formed to be recessed in the axial direction in an approximate U shape in cross section, so that the wall surface 151 approximately parallel to the axial direction is formed. Therefore, even when oil is dropped onto the electromagnetic clutch 100 in a checking of the engine or in an addition operation of an engine oil, the dropped oil falls downwardly along the circular recess 150 (wall surface 151) without flowing toward the friction surface 140c.

Further, oil adhered on the head portion of the bolt 111 is moved to the inner-peripheral side wall surface 140e. However, the electromagnetic clutch 100 is assembled to the crank shaft of the engine so that an axial direction of the electromagnetic clutch 100 becomes substantially horizontal, and the taper portion 140d is provided in the wall surface 140e so that a diameter of the inner-peripheral side wall surface 140e is increased as toward to a side opposite to the friction surface 140c. Therefore, oil moved to the inner-peripheral side wall surface 140e flows to a side opposite to the friction surface 140c and falls from the electromagnetic clutch 100 downwardly, without flowing to the side of the friction surface 140c. As a result, even when oil falls to the electromagnetic clutch 100 in the checking of the engine or in the addition of the engine oil, it can prevent the dropped oil from being adhered on the friction surface 140c.

The stator plate 134 is fixed to the engine (i.e., crank casing of the engine) through the bushing 135 made of an elastic material. Therefore, a vibration displacement of the stator housing 131 (electromagnetic coil 130) relative to the rotor 120, generated by the vibration of the engine, can be absorbed. Simultaneously, dimension differences of the stator housing 131 and the rotor 120 can be also absorbed. Accordingly, the clearance between the stator housing 131 and the rotor 120 can be maintained at a suitable value. Thus, it can prevent a magnetic resistance from being increased between the stator housing 131 and the rotor 120, and it can prevent an electromagnetic-absorbing force applied between the armature 140 and the rotor 120 from being decreased.

Further, because the collar 133 is disposed between the bearing 132 and the bearing 127 in the axial direction, a relative position relationship between the bearing 132 and the bearing 127 can be maintained while the relative position between the bearing 132 and the bearing 127 is readily determined. Accordingly, it can prevent the bearing 132 from being moved relative to the bearing 127.

Figure 6:
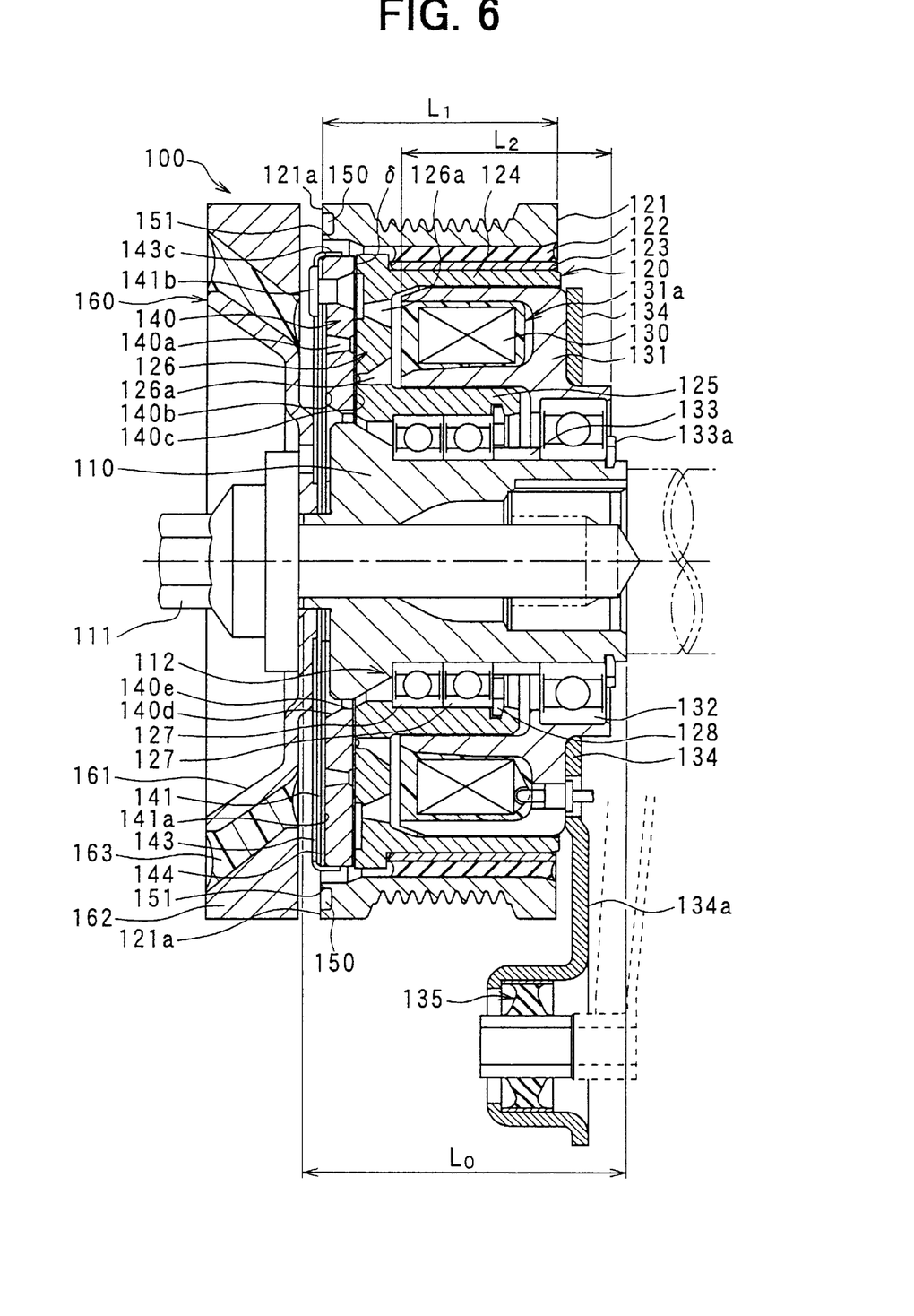
FIG. 6 is a sectional view showing an electromagnetic clutch according to a second preferred embodiment of the present invention.

A second preferred embodiment of the present invention will be now described with reference to FIG. 6. In the second embodiment, a third damper 160 (sub-damper) is added in the hub 110. The third damper 160 is fixed to the hub 110 together with the armature 140 by using the bolt 111. The third damper 160 includes a metal hub 161 formed integrally with the hub 110 into a pot like, a weight portion 162 formed into a circular shape at an outer peripheral side of the hub 161, and an elastic member connecting the hub 161 and the weight portion 162. For example, the elastic member 163 is made of an elastic material such as ethylene-propylene-diene polymer rubber (EPDM). In the second embodiment, the other parts are similar to those of the above-described first embodiment. Accordingly, even in the second embodiment, the effects described in the first embodiment can be obtained.

Although the present invention has been fully described in connection with the preferred embodiments thereof with reference to the accompanying drawings, it is to be noted that various changes and modifications will become apparent to those skilled in the art.

For example, in the above-described embodiments, the plate spring 141 is covered by the second damper 142. However, the armature can be covered by the second damper 142 only in the opposite portion 140b opposite to the plate spring 141.

In the above-described embodiments, the second damper member 142 is bonded and fixed to the plate spring 141 by the vulcanizing bonding. However, the second damper member 142 can be bonded and fixed to the plate spring 141 using a bonding method or a mechanical method using a rivet.

In the above-described embodiments, the vibration-restriction steel plate 143 constructs vibration-restriction means for absorbing the vibration of the armature 140. However, the vibration-restriction means can be constructed by a rubber member (e.g., EPDM). In this case, for sufficiently obtaining the vibration-restricting effect, the thickness of the rubber member is set to be equal to or larger than 2 mm. In the above-described embodiments, the vibration-restriction steel plate 143 is bonded; however, the vibration-restriction steel plate 143 can be fixed to the armature 140 by using mechanical members such as rivets and screws.

In the above-described embodiments, both the circular recess 150 (the wall surface 151) and the taper portion 140d are provided for preventing oil from being adhered on the friction surface 140c. However, one of the circular recess 150 and the taper portion 140d can be provided for preventing oil from being adhered on the friction surface 140c.

In the above-described embodiments, the bearing 132 is disposed between the stator housing 131 and the hub 110. However, the bearing 132 can be omitted. In this case, it is necessary to fix the stator housing 131 to the engine in the arm portion 134a through the bushing 135, at least at two positions.

In the above-described embodiments, the bearing 132 is inserted between the collar 133 disposed to contact the axial end of the bearing 127 and the stop ring 133a in the axial direction, so that the axial position of the bearing 132 is set. However, in a case where a step portion is provided in the hub 110 so that a diameter of a hub position into which the bearing 132 is press-fitted is smaller than a hub position into which the bearing 127 is press-fitted, the attachment position of the bearing 132 can be set by inserting the bearing 132 between the step portion and the stop ring 133a in the axial direction.

In the above-described embodiments, the present invention is typically applied to the electromagnetic clutch 100 attached to the crank shaft of the engine, for interruptibly transmitting the driving force to the compressor 200. However, the present invention can be applied to an another electromagnetic clutch for the other use.

In the electromagnetic clutch 100 described in the above embodiments, the driving force is input from a side of the hub 110, and the driving force is output from a side of the pulley 121 (rotor 120). However, the driving force may be input from the side of the pulley 121 and may be output from the side of the hub 110.

In the above-described embodiments, the hub 110 used as the driving-side rotation member and the rotor 120 used as the driven-side rotation member are coaxially arranged in a double-cylinder like in parallel; however, may be coaxially arranged in series.

In the above-described embodiments, the bonding sheet 144 is constructed by permeating (applying) an adhesive (e.g., epoxide resin) into the nonwoven fabric. However, an adhesive having elasticity can be used as the bonding sheet. In this case, the thickness of the adhesive is made equal to or larger than the thickness corresponding to the nonwoven fabric.

In the above-described embodiments, the rotor 120 and the stator housing 131, which are the driven-side rotation member, are disposed at the outer radial side of the hub 110 used as the driving-side rotation member. However, the arrangement position of the driven-side rotation member and the driving-side rotation member can be changed.

Such changes and modifications are to be understood as being within the scope of the present invention as defined by the appended claims.

What is claimed is:

1. An electromagnetic clutch for transmitting and interrupting a driving force of a driving source to a driven device, the electromagnetic clutch comprising:

a driving-side rotation member disposed to be rotated by the driving source;

a driven-side rotation member disposed rotatably to be connected to a side of the driven device;

an electromagnetic coil for generating an electromagnetic force when being supplied with power;

an armature connected to one of the driving-side rotation member and the driven-side rotation member, the armature having a friction surface that contacts the other one of the driving-side rotation member and the driven-side rotation member by the electromagnetic force generated from the electromagnetic coil, to transmit the driving force from the driving-side rotation member to the driven-side rotation member, wherein the driving-side rotation member, the driven-side rotation member and the armature are disposed so that a rotation axis of the armature is substantially horizontal;

a bearing member located between the driven-side rotation member and the driving-side rotation member;

a circular recess portion recessed in an approximate U-shape in cross section in a rotation axial direction of both the driving-side rotation member and the driven-side rotation member, to enclose the armature at an outer radial side of the armature; and a cylinder member disposed to cover an outer peripheral side of the armature, wherein the circular recess portion is provided at an axial end surface of the cylinder member in the axial direction.

2. The electromagnetic clutch according to claim 1, wherein:

the armature is disposed to be fixed to the driving-side rotation member and to be rotated integrally with the driving-side rotation member; and the driven-side rotation member and the electromagnetic coil are disposed at a radial outer side of the driving-side rotation member.

3. The electromagnetic clutch according to claim 1, wherein:

the driving-side rotation member has an axial dimension in an axial direction;

the driven-side rotation member and the electromagnetic coil have axial dimensions, respectively, in the axial direction; and each axial dimension of the driven-side rotation member and the electromagnetic coil is made to be equal to or smaller than the axial dimension of the driving-side rotation member.

4. The electromagnetic clutch according to claim 1, further comprising:

holding member for holding the electromagnetic coil; and a bushing made of an elastic material, through which the holding member is fixed.

5. The electromagnetic clutch according to claim 4, wherein the bearing member includes a first bearing disposed between the holding member,and the one of the driving-side rotation member and the driven-side rotation member.

6. The electromagnetic clutch according to claim 5, wherein:

the first bearing is disposed to be fixed to the driven-side rotation member; and the bearing member further includes a second bearing through which the driving-side rotation member and the driven-side rotation member are disposed coaxially, the electromagnetic clutch further comprising
   a cylindrical collar disposed between the first bearing and the second bearing.

7. The electromagnetic clutch according to claim 1, wherein the electromagnetic clutch further comprises a wall surface provided in a ring shape to enclose the armature at an outer radial side of the armature, the wall surface being substantially parallel to each rotation axis of both the driving-side rotation member and the driven-side rotation member.

8. The electromagnetic clutch according to claim 1, wherein:

an inner peripheral wall surface of the armature is provided with a taper portion tapered in such a manner that a diameter of the inner peripheral wall surface increases in a direction away from the friction surface.

9. The electromagnetic clutch according to claim 1, wherein:

the driving source is an internal combustion engine with a crank shaft; and the driving-side rotation member is connected to the crank shaft of the driving source.

10. The electromagnetic clutch according to claim 1, further comprising:

a spring member disposed to be partially connected to the armature, for generating an elastic force for separating the armature from the other one of the driving-side rotation member and the driven-side rotation member; and a damper member for absorbing a collision shock, the damper member being disposed at least on one of a surface of the spring member opposed to the armature and a surface of the armature opposed to the spring member.

11. The electromagnetic clutch according to claim 10, wherein the damper member is made of rubber.

12. The electromagnetic clutch according to claim 10, wherein:

the spring member is a plate spring; and the damper member is coated on a surface of the plate spring.

13. The electromagnetic clutch according to claim 10, further comprising a rivet through which the spring member and the armature are partially connected.

14. The electromagnetic clutch according to claim 10, further comprising a vibration-restriction member, which is fixed to the armature, for absorbing vibration of the armature.

15. The electromagnetic clutch according to claim 1, wherein:

the driving source is an engine for powering a vehicle; and the driven device is a rotation unit disposed in an engine compartment of the vehicle.

16. The electromagnetic clutch according to claim 1, further comprising a vibration-restriction member, which is fixed to the armature, for absorbing vibration of the armature.

17. The electromagnetic clutch according to claim 16, wherein the vibration-restriction member has a three-layer structure in which a resin layer made of a visco-elastic resin is inserted between two steel plates.

18. The electromagnetic clutch according to claim 16, wherein the vibration-restriction member is made of rubber.

19. The electromagnetic clutch according to claim 1, further comprising:

a vibration-restriction member, disposed to be fixed to the armature, for absorbing vibration of the armature;

and a bonding member made of a visco-elastic material, through which the vibration-restriction member is fixed to the armature.

20. The electromagnetic clutch according to claim 19, wherein the vibration-restriction member has a three-layer structure in which a resin layer made of a visco-elastic resin is inserted between two steel plates.

21. The electromagnetic clutch according to claim 19, wherein the vibration-restriction member is made of rubber.

22. The electromagnetic clutch according to claim 19, wherein the bonding member is a bonding sheet in which an adhesive is applied onto both surfaces of an elastic non-woven fabric.

* * * * *

UNITED STATES PATENT AND TRADEMARK OFFICE
CERTIFICATE OF CORRECTION

PATENT NO. : 6,622,843 B2
DATED : September 23, 2003
INVENTOR(S) : Nakagawa et al.

It is certified that error appears in the above-identified patent and that said Letters Patent is hereby corrected as shown below:

<u>Title page,</u>
Item [75], Inventors, correct the fifth inventor's name to -- Katsuya Tsuchiizu --

Signed and Sealed this

Twenty-first Day of December, 2004

JON W. DUDAS
*Director of the United States Patent and Trademark Office*